Patented May 7, 1929.

1,711,545

UNITED STATES PATENT OFFICE.

ERNST WILLI SCHMIDT, OF KLEIN-WANZLEBEN, NEAR MAGDEBURG, GERMANY, ASSIGNOR TO THE FIRM OF I. D. RIEDEL-E. DE HAEN A.-G., OF BERLIN-BRITZ, GERMANY.

PROCESS OF DISINFECTING SEEDS AND COMPOSITION THEREFOR.

No Drawing. Application filed July 2, 1926, Serial No. 120,247, and in Germany November 20, 1925.

My invention relates to a composition for disinfecting seeds with a view to protecting them against the attack of parasites.

According to my invention I employ a mixture of a pulverulent calcium silico fluoride and copper carbonate, which when employed in a solution sufficiently concentrated to effectively kill the parasites, would greatly injure the seeds.

By the addition of calcium silico fluoride to copper carbonate this latter compound the fungicidal action of which is rather unreliable, obtains greatly improved properties both as regards the fungicidal action and the reliability of such action. This is due to the fact that under the action of the moisture contained in the soil, a reaction takes place between the calcium silico fluoride and part or all of the copper carbonate, whereby copper silico fluoride is formed, which has a very vigorous fungicidal action.

If copper carbonate in excess is used, part of it will remain over and will complete the action of the fluoride, such fungi, which may not yet be killed by the fluoride, being destroyed by the slowly dissolved copper carbonate in excess.

I may, for instance, use a mixture of 50 parts of calcium silico fluoride and 50 parts of copper carbonate, or a mixture of 100 parts of calcium silico fluoride and 67 parts of copper carbonate, the two components being thus mixed in the proportion of 3:2.

The quantity of disinfecting mixture, which fully suffices for killing the parasites, is one to two per cent of the weight of the seeds. If wheat shall for instance be disinfected, 50 kgs. of the seeds are intimately mixed with 500 grams of one of the mixtures above described, which has previously been reduced to a fine powder. If the seeds are then deposited in the soil they will remain unaffected by any parasites which may have adhered to them before or which exist in the soil. In some cases I may even use less than the percentage above described. In the mixtures employed according to the foregoing the silico fluoride is slowly and gradually dissolved by the liquid present in the soil and a dilute solution is formed, which acts on the copper compound so as to dissolve it and cause it to exert its disinfecting action, which it would not have done if admixed to the seeds alone by itself. In all cases the concentration of the solution thus formed in the soil is so low that no injurious effect on the seeds will take place. Moreover, as the dissolution of the components of the mixture is a slow and gradual one, a lasting protection is afforded the seeds.

I wish it to be understood that I do not desire to be limited to the exact manner of proceeding nor to the particular substances and proportions hereinbefore described for obvious modifications will occur to a person skilled in the art.

I claim:—

1. A composition for disinfecting seeds comprising pulverulent calcium silico fluoride and copper carbonate.

2. A composition for disinfecting seeds comprising a pulverulent mixture of about three parts calcium silico fluoride and two parts copper carbonate.

In testimony whereof I affix my signature.

ERNST WILLI SCHMIDT.